US012762925B2

(12) United States Patent
Van Niekerk et al.

(10) Patent No.: US 12,762,925 B2
(45) Date of Patent: Oct. 13, 2026

(54) IMPOSSIBLE SLOT PLAY USING VIRTUAL WAGERING GAMES AND GAMING ENVIRONMENTS

(71) Applicant: IGT, Las Vegas, NV (US)

(72) Inventors: Karen Van Niekerk, Dieppe (CA); Todd Grimm, Riverview (CA); David Froy, Lakeville-Westmorland (CA); Aaron Corey, Moncton (CA); Daniel Landry, Moncton (CA); Bethany Plimmer, Lower Coverdale (CA); David Small, Moncton (CA); Carman Misener, Moncton (CA)

(73) Assignee: IGT, Las Vegas, NV (US)

( * ) Notice: Subject to any disclaimer, the term of this patent is extended or adjusted under 35 U.S.C. 154(b) by 332 days.

(21) Appl. No.: 18/476,179

(22) Filed: Sep. 27, 2023

(65) Prior Publication Data

US 2025/0104512 A1 Mar. 27, 2025

(51) Int. Cl.
*G07F 17/32* (2006.01)

(52) U.S. Cl.
CPC ...... *G07F 17/3227* (2013.01); *G07F 17/3213* (2013.01); *G07F 17/3267* (2013.01); *G07F 17/3239* (2013.01)

(58) Field of Classification Search
CPC ............. G07F 17/3227; G07F 17/3213; G07F 17/3267; G07F 17/3239
See application file for complete search history.

(56) References Cited

U.S. PATENT DOCUMENTS

| | | | | |
|---|---|---|---|---|
| 10,846,983 | B2 | 11/2020 | Frenkel | |
| 2003/0003988 | A1 * | 1/2003 | Walker | G07F 17/323 463/21 |
| 2006/0205484 | A1 * | 9/2006 | Nicastro | G07F 17/3244 463/25 |
| 2009/0082088 | A1 * | 3/2009 | Anderson | A63F 1/04 463/20 |
| 2009/0143141 | A1 * | 6/2009 | Wells | G07F 17/3239 463/37 |
| 2017/0300116 | A1 * | 10/2017 | Lyons | G06F 3/016 |
| 2023/0055749 | A1 * | 2/2023 | Danala | A63F 13/47 |

* cited by examiner

*Primary Examiner* — Kevin Y Kim
(74) *Attorney, Agent, or Firm* — Spencer Fane LLP; William M. Kelly

(57) ABSTRACT

A system includes a processor circuit and a memory coupled to the processor circuit. The memory includes machine-readable instructions that, when executed by the processor circuit, cause the processor circuit to provide, by the processor circuit, a virtual environment in a metaverse. The virtual environment includes a virtual electronic gaming machine (EGM). The processor circuit is further caused to receive, via the processing circuit and from a gaming device that is in a physical world and that corresponds to a user, an identification of a modification to the virtual environment that is not possible in the physical world. The processor circuit further caused to provide, responsive to receiving the identification of the modification and via the processing circuit, the modification to the virtual environment.

20 Claims, 14 Drawing Sheets

600

700

800

IMPOSSIBLE SLOT PLAY USING VIRTUAL WAGERING GAMES AND GAMING ENVIRONMENTS

BACKGROUND

Embodiments described herein relate to game play features with wagering games. In real-world slot machines such as electronic gaming machines (EGMs), the physical configuration and/or operation may place inherent limitations on certain aspects of game play. For example, game play of some features may be limited by the physics of EGMs. Thus, some features that could improve a player's experience may be impossible in the physical implementations of the real-world. As virtual gaming applications, such as metaverse applications, proliferate, there is a need to provide a wide variety of content for a wide variety of customers and customer interests that are not limited by the physical world.

BRIEF SUMMARY

According to some embodiments, a system includes a processor circuit and a memory coupled to the processor circuit. The memory comprises machine readable instructions that, when executed by the processor circuit, cause the processor circuit to perform operations including providing, by a processor circuit, a virtual environment in a metaverse. In some embodiments, the virtual environment includes a virtual electronic gaming machine (EGM). Operations may further include receiving, via the processing circuit and from a gaming device that is in the physical world and that corresponds to a user, an identification of a modification to the virtual environment that is not possible in the physical world. Operations include providing the modification to the virtual gaming environment in responsive to receiving the identification of the modification and via the processing circuit.

According to some embodiments, a gaming device includes a display device, an input device, a processor circuit and a memory coupled to the processor circuit. Embodiments include performing operations of systems/methods of generating and providing a virtual wagering game is illustrated. Operations according to some embodiments include providing, by a processor circuit, a virtual environment in a metaverse. The virtual environment includes a virtual electronic gaming machine (EGM). Operations may further include receiving, from a gaming device that is in a physical world and that corresponds to a user, an identification of a modification to the virtual environment that is not possible in the physical world. Operations may include providing, responsive to receiving the identification of the modification and via the processing circuit, the modification to the virtual environment and receiving identities of multiple virtual EGMs that correspond to a virtual EGM favorite list that includes a first virtual EGM and a second EGM in the virtual environment. In some embodiments, the user includes a user avatar in the metaverse that corresponds to the user and the virtual EGM includes a skill-based game. Some embodiments provide that the metaverse includes a spectator avatar corresponding to another user that is watching the user's performance on the virtual EGM. In such embodiments, the processor circuit may be caused to receive a wager from the spectator avatar based on the user's performance in the virtual EGM.

According to some embodiments operations of systems/methods include several operations herein. Operations may include providing a virtual environment in a metaverse. In some embodiments, the virtual environment includes a virtual electronic gaming machine (EGM). Operations may include receiving, from a gaming device that is in a physical world and that corresponds to a user, an identification of a modification to the virtual environment that is not possible in the physical world. Operations may include providing, responsive to receiving the identification of the modification and via the processing circuit, the modification to the virtual environment. In some embodiments, the modification to the virtual environment includes a modification to change a quantity of virtual EGMs in the virtual environment. In some embodiments, the virtual EGMs include a first game type having a virtual symbol matching EGM and a second game type including a virtual table game.

DETAILED DESCRIPTION

Figure 1:
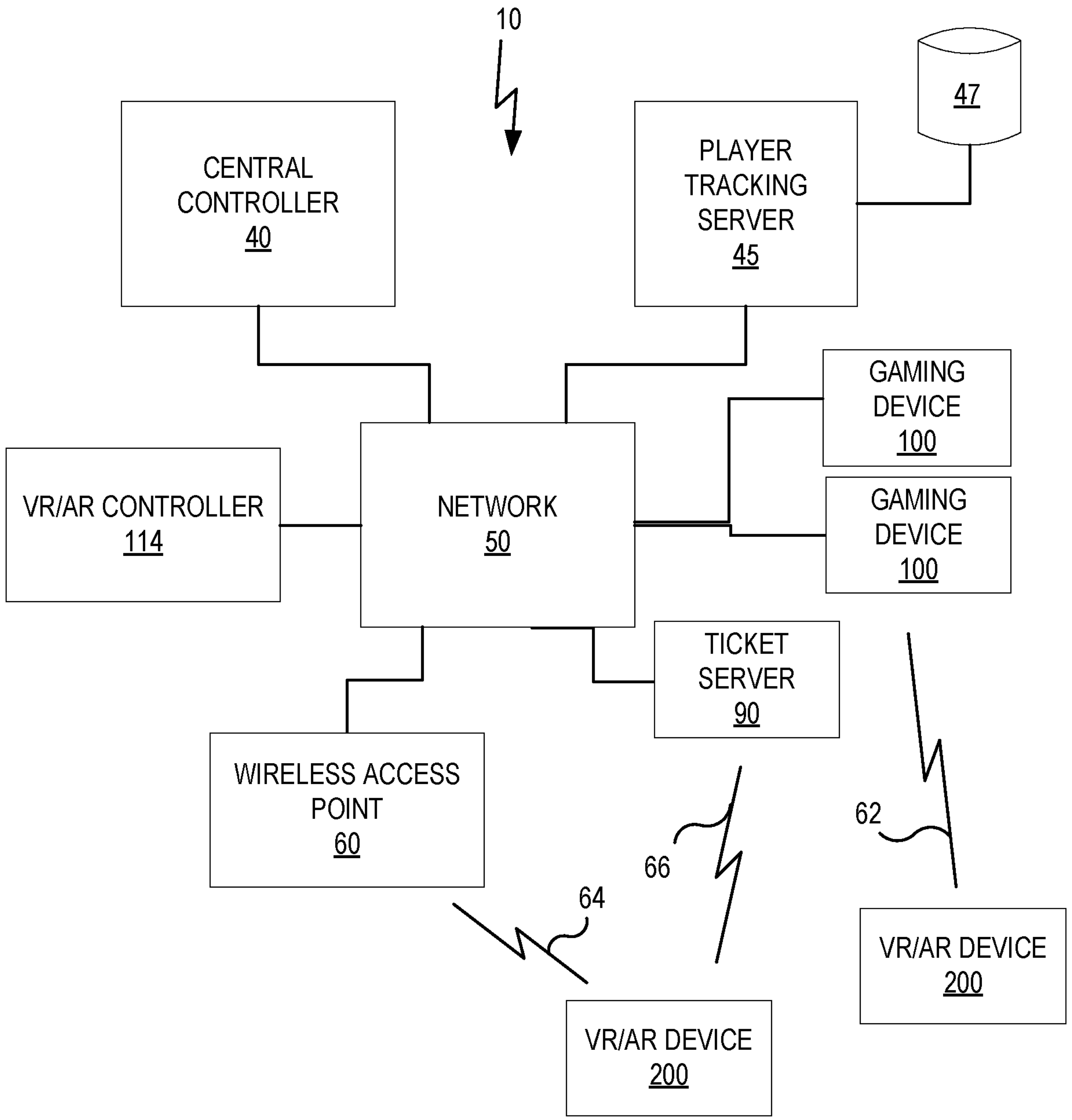
FIG. 1 is a schematic block diagram illustrating a network configuration for a plurality of gaming devices according to some embodiments.

Embodiments herein may relate to using a virtual EGM to provide game play features that would otherwise be impossible using a physical EGM or other type of slot machine.

As provided herein, by using the metaverse, players can immerse themselves into the slot games that they play, allowing for different experiences that would not be possible in real-world game play situations. In this manner, the game play experience may expand in a way that allows for "impossible" real like scenarios to play out in a virtual world where the laws of physics that cannot be performed in the real world become possible in the metaverse.

In real-world slot machines, there may be many types of bonus features that can be implemented to enhance game play experience and offer fun, exciting opportunities to win money. Non-limiting examples include free-spins, pick-a-prizes, and/or wheel spins, among others. In the metaverse, it may be possible to become immersed within the games and play those bonuses as if they were really happening to you in real time. In such embodiments, an experience that could not be possible otherwise may be offered.

In some embodiments, the metaverse may provide that a user playing a game show these casino game can be transported into the game show as a real contestant. For example, in a given game show-based game, a player may find themselves on the stage at the game show studios where an iconic feature of the show may be present. Upon triggering a bonus corresponding to the iconic feature, the player gets to simulate actuating that feature as it appears on the show to determine their bonus win.

In another example game show, the player may be on stage with 10 or more models, each holding a case. The player may get to pick which cases to open to reveal the contents and the host may reveal offers from a game banker that may be accepted or rejected.

Some embodiments provide the ability to multiple ones of your favorite games at the same time. Example embodiments may include an EGM and a table game that are situated proximate one another so both can be played without the player having to leave one game to play the other. One example includes a craps table and a particular EGM that may be played at the same time. In the metaverse, a player can set up their world to have a slot machine "delivered" right next to the craps table. While they are wagering craps (but not rolling the dice), they could be wagering on the EGM.

In some embodiments, a slots-only player that has multiple EGMs in their "favorites" list may have their metaverse world set up to provide that all of or several of their favorite games are located in the same specific area for them to play. Some embodiments provide that the favorite games may be played on a giant multi-screen EGM in the metaverse set up with the favorite games. In some embodiments, with a single press of play and a "super wager", the player may play several or all of their games at the exact same time. In some embodiments, multiple bonus triggers could be queued up to play one at a time.

In some embodiments, a metaverse world may be provided that includes dimensionality that would be impossible in a physical world implementation. Some embodiments provide that a virtual EGM may include a potentially infinite number of reels and/or an infinite reel height. For example, a virtual EGM may include a game that can grow to 100 rows high and/or 100 columns across. In some embodiments, a player can choose to wager amongst all of a subset of the visible reel picture. In some embodiments, payouts can be adapted based on the size of the reel picture selected. Some embodiments provide that a game may have a practically limitless number of bets.

In some embodiments, multiple games from the same theme and/or brand may be merged into a single game. For example, a player of a game having a first title corresponding to a first brand may be able to play another game having a second title that corresponds to the first brand. In some embodiments, the second title may be a sequel and/or version of the first title.

Some embodiments provide multi-player player and watch opportunities. For example, in a scenario in which one avatar is playing a skill-based game, other players and/or avatars may be able to bet on how that player performs.

Some embodiments provide a pay to replay feature in which a player and/or avatar loses all their money in their metaverse game play experience. In such embodiments, the player may place a wager to replay their experience to determine if the outcome would be different. In some embodiments, this may be provided for a particular pick-bonus and/or another skill-based game.

Some embodiments provide warp into game feature in which a player triggers a bonus and thus may be warped into the game to play that particular bonus. For example, a game in which a virtual creature or object may select which destination for the virtual creature to be moved. The different destinations may provide different amounts and/or types of credits that may be collected by the player. The player can warp into the game and become the virtual creature or object and make the jumps themselves to collect their prizes.

Embodiments described herein relate to game play features with wagering games, and in particular to providing EGM features for virtual wagering games and gaming environments, and related devices, systems, and methods. For a virtual gambling (e.g., casino play) application, the system may manage and track user transactions in the venue. In some embodiments a virtual casino venue may be a virtual location where users can play casino-like games, interact with other players, and/or engage in social activities such as attending virtual concerts or events. Players may be able to create avatars to represent themselves in the virtual world, can earn virtual currency that can be used to purchase virtual goods, traded, or even exchanged for real money. The virtual casino and other metaverse experiences can be provided through a variety of devices and technologies, such as virtual reality (VR), augmented reality (AR), personal computing devices, mobile computing devices, home entertainment technologies such as smart televisions and/or set-top boxes, etc.

In some embodiments, the system may include an app or features for providing guided tours of the virtual venue or other amenities, such as a virtual preview through the app before an actual visit, a preview of the available games, and/or a game finder feature, for example.

Before describing these and other features in greater detail, reference is now made to FIG. 1, which illustrates a gaming system 10 including a plurality of gaming devices 100. The gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
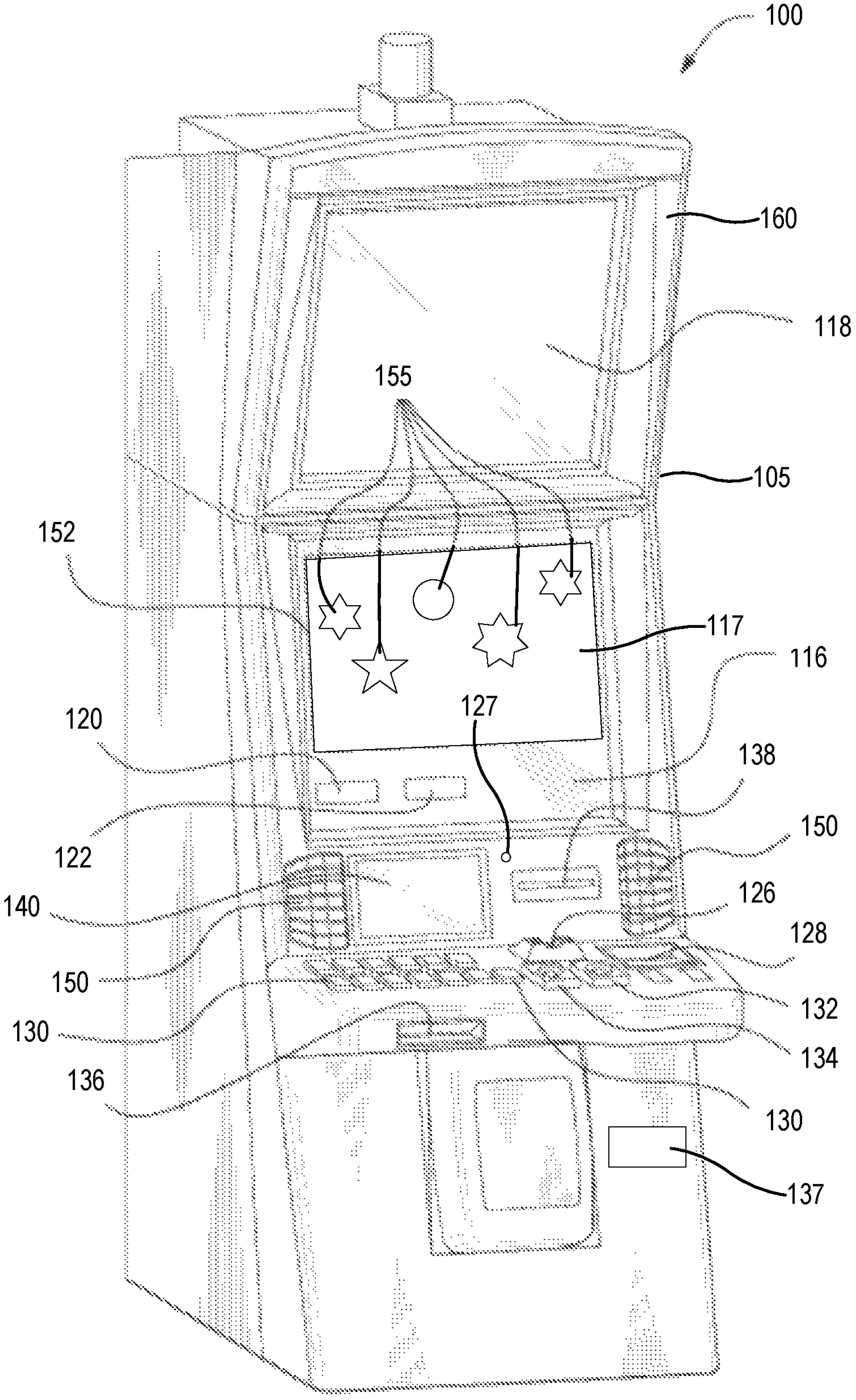
FIG. 2A is a perspective view of a gaming device that can be configured according to some embodiments.
Figure 2B:
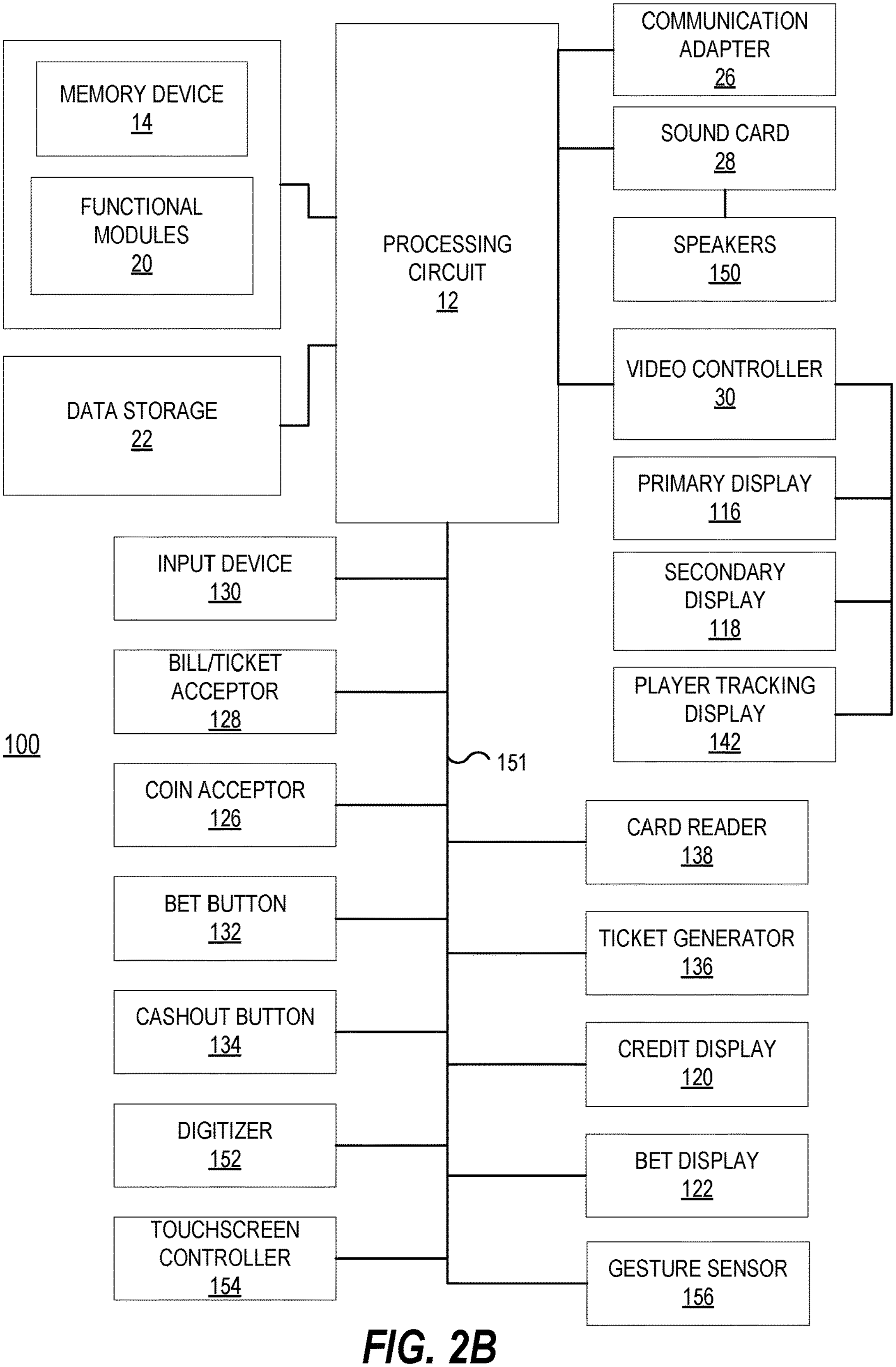
FIG. 2B is a schematic block diagram illustrating an electronic configuration for a gaming device according to some embodiments.
Figure 2C:
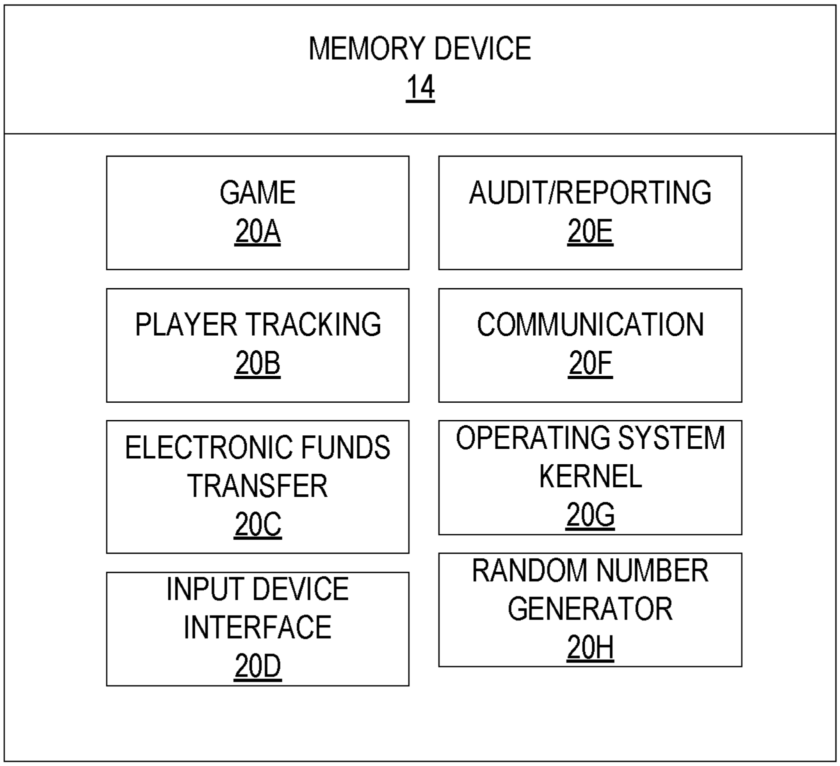
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
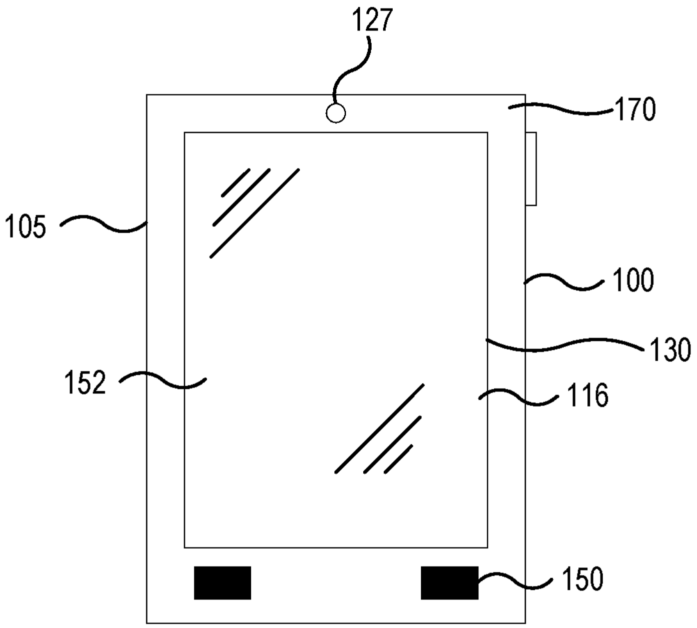
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
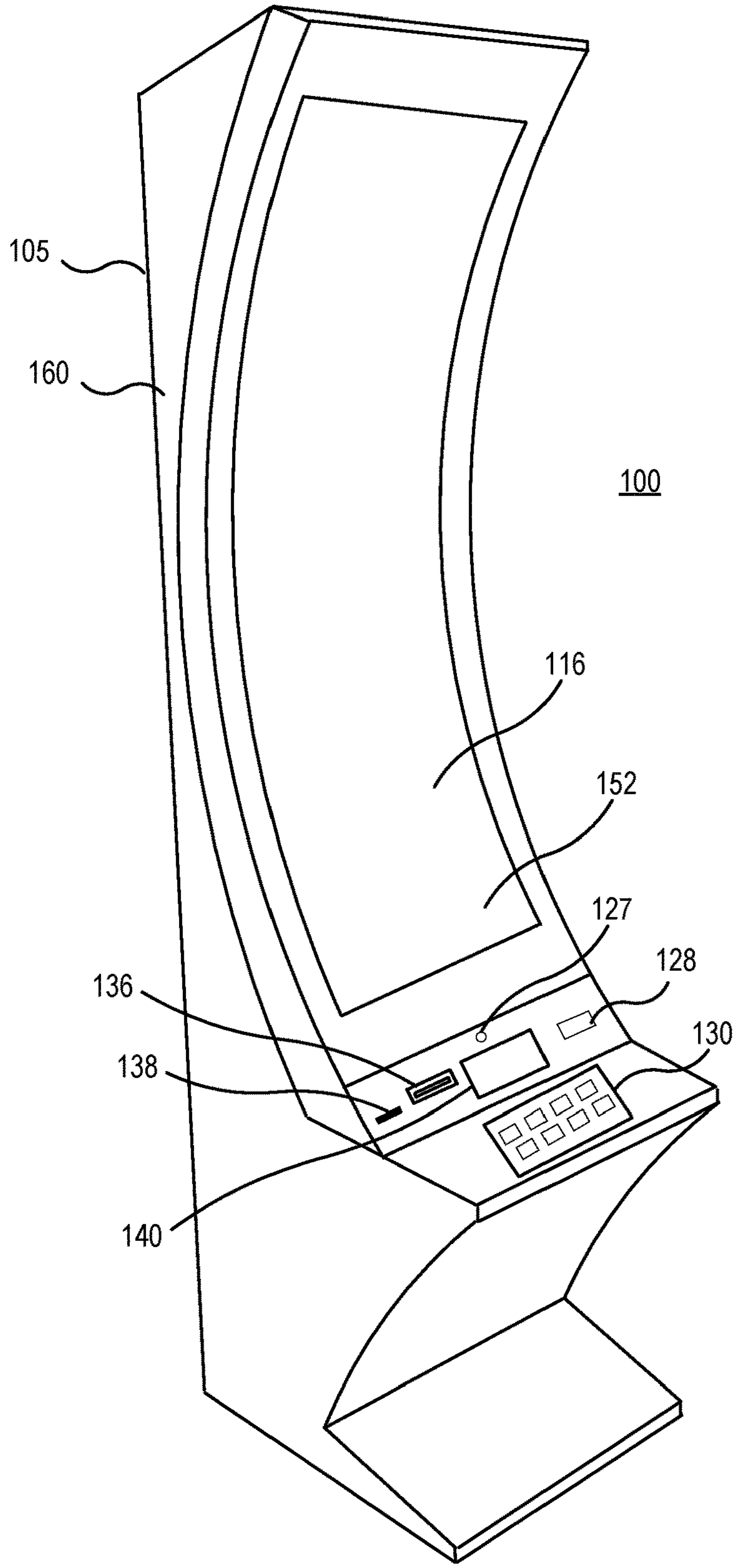
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 2F:
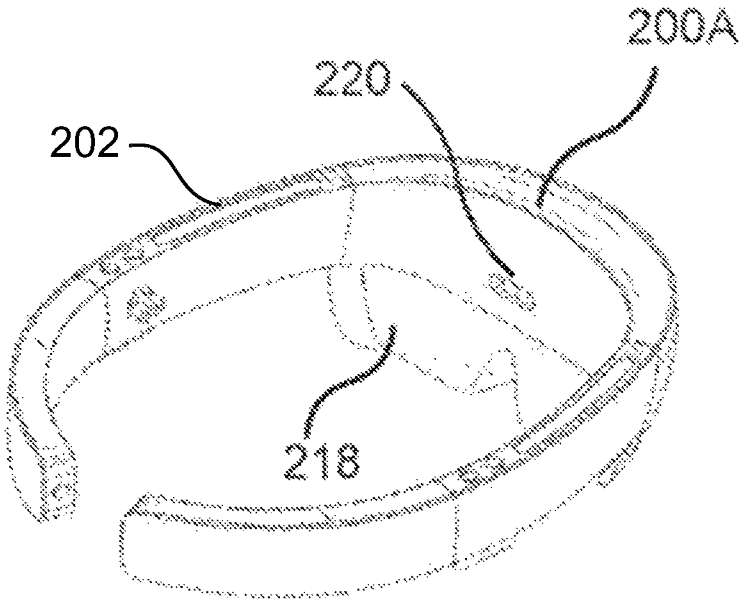
FIG. 2F and FIG. 2G illustrate VR/AR devices according to various embodiments.

FIG. 2F illustrates a virtual reality (VR) viewer 200A implemented as a 3D headset including a pair of displays 218 on which images of virtual objects may be displayed. The viewer 200A includes a head-wearable frame 202, with the displays 218 coupled to the frame 202 to position the display device in a field of view of user wearing the viewer 200A. Different stereoscopic images may be displayed on the displays 218 to create an appearance of depth. The VR viewer 200A may include a plurality of sensors 220 that the device uses to determine a position, orientation, and/or movement of the viewer 200A, which may be used to determine a position, orientation, and/or direction of movement within an SVE.

The viewer 200A may further include other sensors, such as a gyroscopic sensor, a GPS sensor, one or more accelerometers, and/or other sensors that allow the viewer 200A to determine its position and orientation in space. In some embodiments, the viewer 200A may include one or more cameras that allow the viewer 200A to determine its position and/or orientation in space using visual simultaneous localization and mapping (VSLAM). viewer 200A may further include one or more microphones and/or speakers that allow the user to interact audially with the device.

In some embodiments, a viewer may also include semi-transparent lenses that allow the user to see both the real world as well as the 3D image rendered on the lenses, e.g., to provide an augmented reality (AR) experience. The viewer may also include additional cameras or other sensors to obtain a live video signal for building a 3D model of the space around the user. The viewer may also generate a 3D image of an object to display to the user that takes into account the real-world objects around the user and allows the user to interact with the 3D object.

Figure 2G:
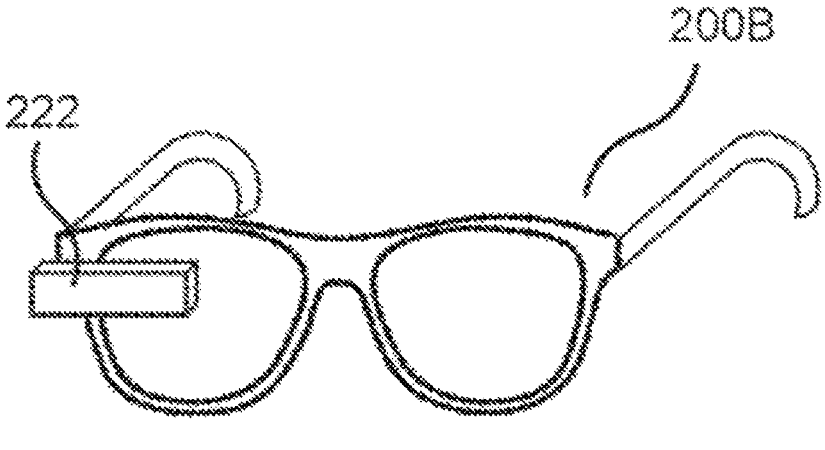

Referring to FIG. 2G, an augmented reality (AR) viewer 200B may be implemented as a pair of glasses including a transparent prismatic display 222 that displays an image to a single eye of the user. Such a device may be capable of displaying images to the user while allowing the user to see the world around the user, and as such can be used as an AR device.

In other embodiments, a VR and/or AR viewer may be implemented using a virtual retinal display device that raster scans an image directly onto the retina of the user. In still further embodiments, a VR and/or AR viewer may be implemented using a mobile wireless device, such as the mobile gaming device 170 of FIG. 2D above, a mobile telephone, a tablet computing device, and/or a personal digital assistant, etc.

Although illustrated as certain gaming devices, such as electronic gaming machines (EGMs), mobile gaming devices, VR/AR headsets, etc., functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3A:
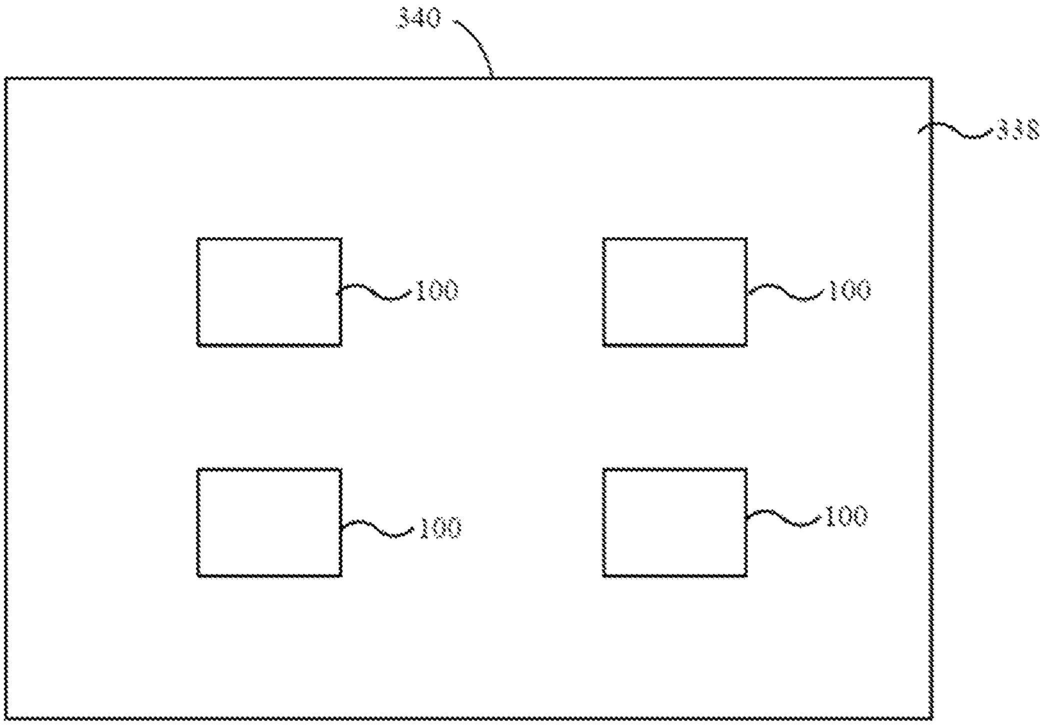
FIG. 3A is a map of a gaming area, such as a casino floor, according to some embodiments.

FIG. 3A illustrates, in plan view, an example map 338 of a gaming area 340. The gaming area 340 may, for example, be a casino floor. The map 338 shows the location of a plurality of gaming devices 100 (e.g., EGMs) within the gaming area 340. As will be appreciated, the locations of the gaming devices 100 within a gaming area 340 are generally fixed, although EGMs may be relocated from time to time, such as when new EGMs are introduced, to create new traffic flow patterns within the gaming area 340, to feature or highlight certain games, etc. As noted above, in order to assist the operation of the VR devices 200, the VR/AR controller 114 may store a three-dimensional wireframe map of the gaming area 340, and may provide the three-dimensional wireframe map to the VR viewers 200.

Figure 3B:
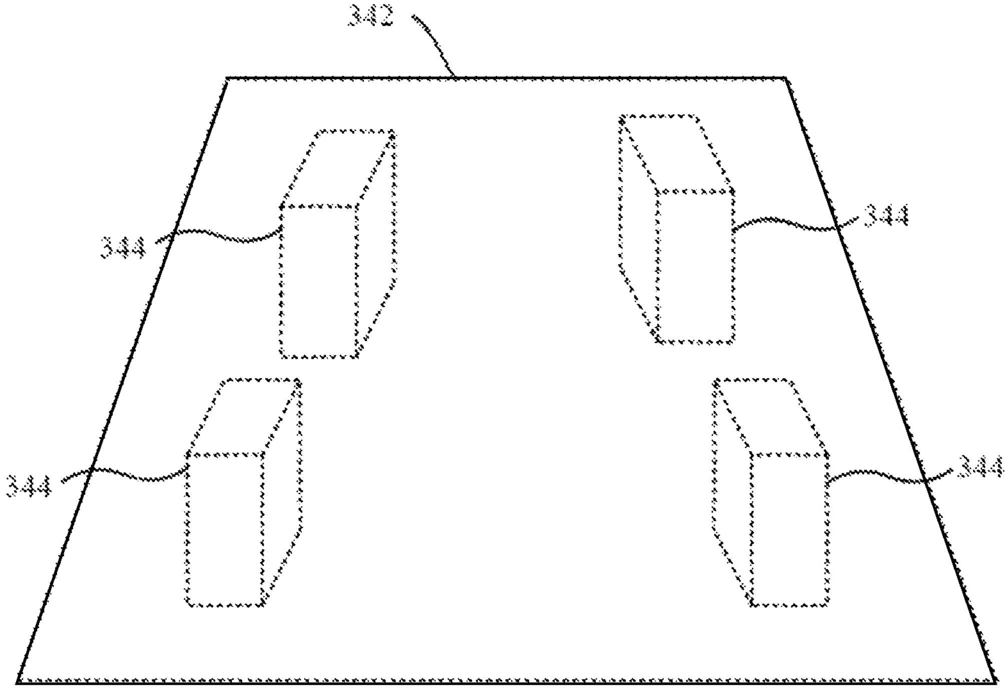
FIG. 3B is a three-dimensional wireframe model of the gaming area of FIG. 3A, according to some embodiments.

An example of a wireframe map 342 for a shared virtual environment (SVE) is shown in FIG. 3B. The wireframe map 342 is a three-dimensional model of the gaming area 340. As shown in FIG. 3B, the wireframe map 342 includes wireframe models 344 that may correspond to the gaming devices 100 that are physically in the gaming area 340. The wireframe models 344 may also be entirely or partially virtual, e.g., existing only in the wireframe model 344 for the SVE. The wireframe models 344 may be pregenerated to correspond to various EGM form factors, such as single display EGMs, mechanical slot EGMs, dual display EGMs, etc. The pregenerated models may then be placed into the wireframe map 342, for example, by a designer or other personnel. The wireframe map 342 may be updated at any time. For example, in an example where the wireframe map 342 corresponds to a real-world gaming area 340, the wireframe map 342 may be updated whenever the physical location of EGMs in the gaming area 340 is changed.

In some embodiments, the wireframe map 342 may be generated automatically using a VR/AR device 200, such as a 3D headset, that is configured to perform a three-dimensional depth scan of its surroundings and generate a three-dimensional model based on the scan results. Thus, for example, an operator using a VR/AR device 200 may perform a walkthrough of the gaming area 340 while the VR/AR device 200 builds the 3D map of the gaming area.

The three-dimensional wireframe map 342 may enable a VR/AR device 200 to more quickly and accurately determine its position and/or orientation within the gaming area. For example, a VR/AR device 200 may determine its location within the gaming area 340 using one or more position/orientation sensors. The VR/AR device 200 then builds a three-dimensional map of its surroundings using depth scanning, and compares its sensed location relative to objects within the generated three-dimensional map with an expected location based on the location of corresponding objects within the wireframe map 342. The VR/AR device 200 may calibrate or refine its position/orientation determination by comparing the sensed position of objects with the expected position of objects based on the wireframe map 342. Moreover, in an AR implementation, the VR/AR device 200 can be aware of objects or destinations within the gaming area 340 that it has not itself scanned, because the VR/AR device 200 has access to the wireframe map 342 of the entire gaming area 340. Processing requirements on the VR/AR device 200 may also be reduced because the wireframe map 342 is already available to the VR/AR device 200.

In some embodiments, the wireframe map 342 may store various information about EGMs in the gaming area, such as the identity, type, orientation and location of various types of EGMs, the locations of exits, bathrooms, courtesy desks, cashiers, ATMs, ticket redemption machines, etc. Such information may be used by a VR/AR device 200 to help the user navigate the gaming area. For example, if a user desires to find a destination within the gaming area, the user may ask the VR/AR device 200 for directions using a built-in microphone and voice recognition function in the VR/AR device 200 or use other hand gestures or eye/gaze controls tracked by the VR/AR device 200 (instead of or in addition to voice control). The VR/AR device 200 may process the request to identify the destination, and then may display a virtual object, such as a virtual path on the ground, virtual arrow, virtual sign, etc., to help the user to find the destination. In some embodiments, for example, the VR/AR device 200 may display a halo or glow around the destination to highlight it for the user, or have virtual 3D sounds coming from it so players could more easily find the machine.

According to some embodiments, a user of a VR/AR device 200 may use the VR/AR device 200 to obtain information about players and/or EGMs on a casino gaming floor. The information may be displayed to the user on the VR/AR device 200 in a number of different ways such as by displaying images on the VR/AR device 200 that appear to be three dimensional or two-dimensional elements of the scene as viewed through the VR/AR device 200. In general, the type and/or amount of data that is displayed to the user may depend on what type of user is using the VR/AR device 200 and, correspondingly, what level of permissions or access the user has. For example, a VR/AR device 200 may be operated in one of a number of modes, such as a player mode, an observer mode or an operator mode. In a player mode, the VR/AR device 200 may be used to display information about particular EGMs on a casino floor. The information may be generic information about an EGM or may be customized information about the EGM based on the identity or preferences of the user of the VR/AR device 200. In an observer mode, the VR/AR device 200 may be used to display information about particular EGMs on a casino floor or information about players of EGMs on the casino floor. In an operator mode, the VR/AR device 200 may also be used to display information about particular EGMs on a casino floor or information about players of EGMs on the casino floor, but the information may be different or more extensive than the information displayed to an observer.

Figure 4A:
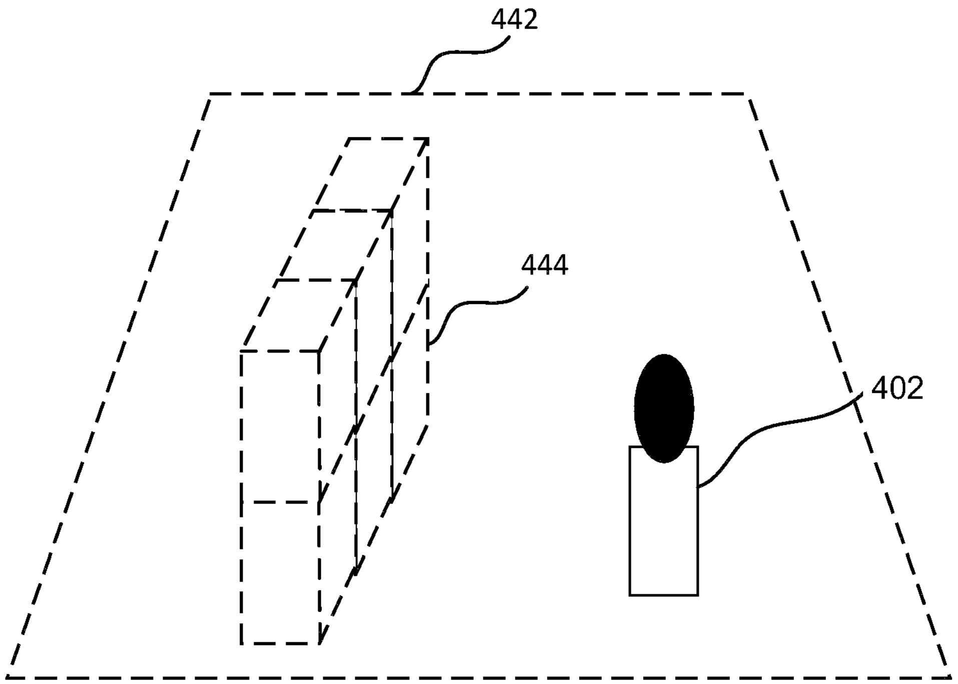
FIG. 4A is a schematic block diagram illustrating an area in a virtual environment according to some embodiments herein.

Brief reference is now made to FIG. 4A, which is a schematic block diagram illustrating an area in a virtual environment according to some embodiments herein. The virtual environment includes a wireframe map of a wagering area 442. The wireframe map 442 may include a depiction of a user 402 who may play multiple different EGMs 444 that are depicted by the wireframe. Some embodiments provide that the different EMS 444 may be played sequentially and/or substantially simultaneously. In some embodiments, a single input may be received that causes all of and/or selected ones of the EGMs 444 to be played at the same time. In some embodiments, the quantity and/or selection of EGMs may be made by the user and may be changed to include different EGMs 444 based on different and/or changing user preference.

Figure 4B:
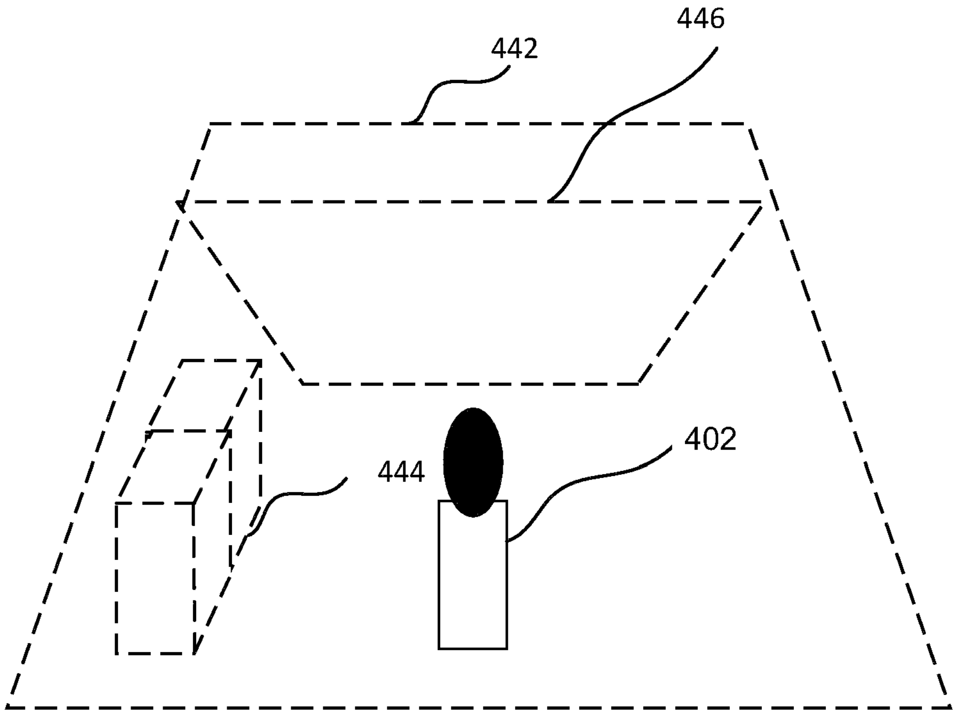
FIG. 4B is a schematic block diagram illustrating an area in a virtual environment according to some embodiments herein.

Brief reference is now made to FIG. 4B, which is a schematic block diagram illustrating an area in a virtual environment according to some embodiments herein. The virtual environment includes a wireframe map of a wagering area 442. The wireframe map 442 may include a depiction of a user 402 who may play multiple different EGMs 444 that are depicted by the wireframe. The wireframe map 442 may include a non EGM game 446. In some embodiments, the non EGM game 446 may include a table game such as craps, black jack, poker, roulette and/or a video lottery terminal (VLT), among others.

Some embodiments provide that the different EMS 444 may be played sequentially and/or substantially simultaneously with non-EGM games 446 in the same virtual space.

Figure 4C:
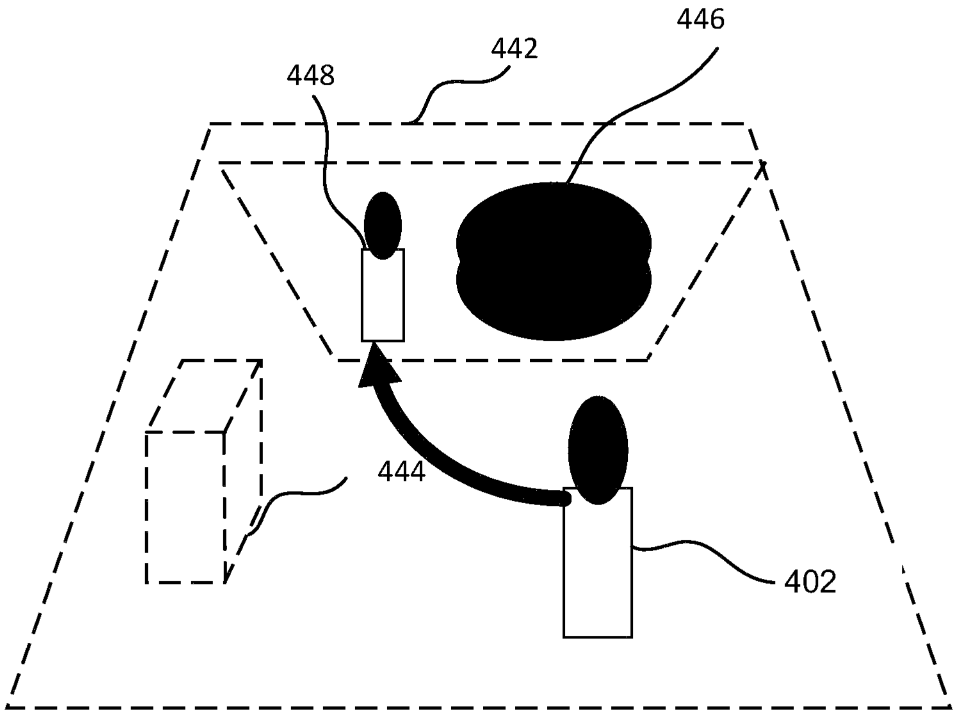
FIG. 4C is a schematic block diagram illustrating an area in a virtual environment according to some embodiments herein.

Brief reference is now made to FIG. 4C, which is a schematic block diagram illustrating an area in a virtual environment according to some embodiments herein. The virtual environment includes a wireframe map of a wagering area 442. The wireframe map 442 may include a depiction of a user 402 who may play one or more different EGMs 444 that are depicted by the wireframe. The wireframe map 442 may include an EGM 444 that is associated with a game show and/or interactive game theme. Responsive to an event that occurs during regular play of the EGM 444, a bonus feature corresponding to other game them specific features 446 may be available. In some embodiments, the specific features 446 may be wheels that can be virtually actuated by the user 402. In some embodiments, the virtual environment may transport the virtual representation of the user 402 into the scene to virtually actuate the specific feature 446 that may be offered to the user 402. In this way the immersive aspect of the virtual environment may be increased.

Figure 5:
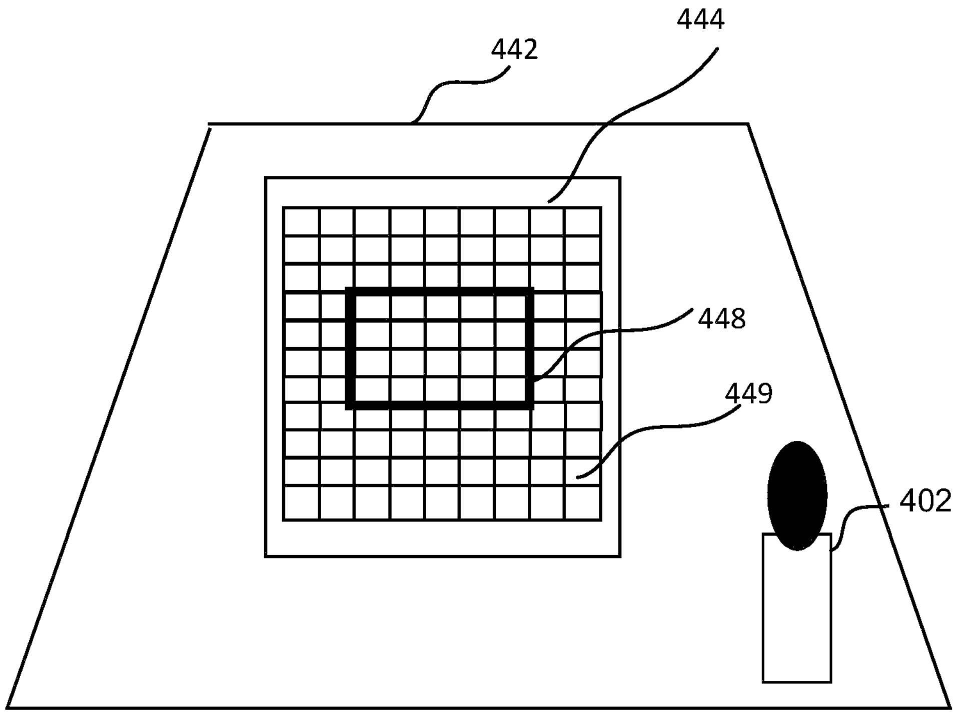
FIG. 5 is a schematic block diagram illustrating an area in a virtual environment according to some embodiments herein.

Brief reference is now made to FIG. 5, which is a schematic block diagram illustrating an area in a virtual environment according to some embodiments herein. The virtual environment includes a wireframe map of a wagering area 442. The wireframe map 442 may include a depiction of a user 402 who may play one or more EGMs 444 that are depicted by the wireframe. In such embodiments, there may be a practically limitless quantity of game elements 449. In some embodiments, the game elements 449 may be arranged in a practically limitless number of reels that depict a practically limitless number of rows and/or columns. In some embodiments, a zone selector 448 may be provided to receive an identification of which of the total number of game elements will be played.

Figure 6:
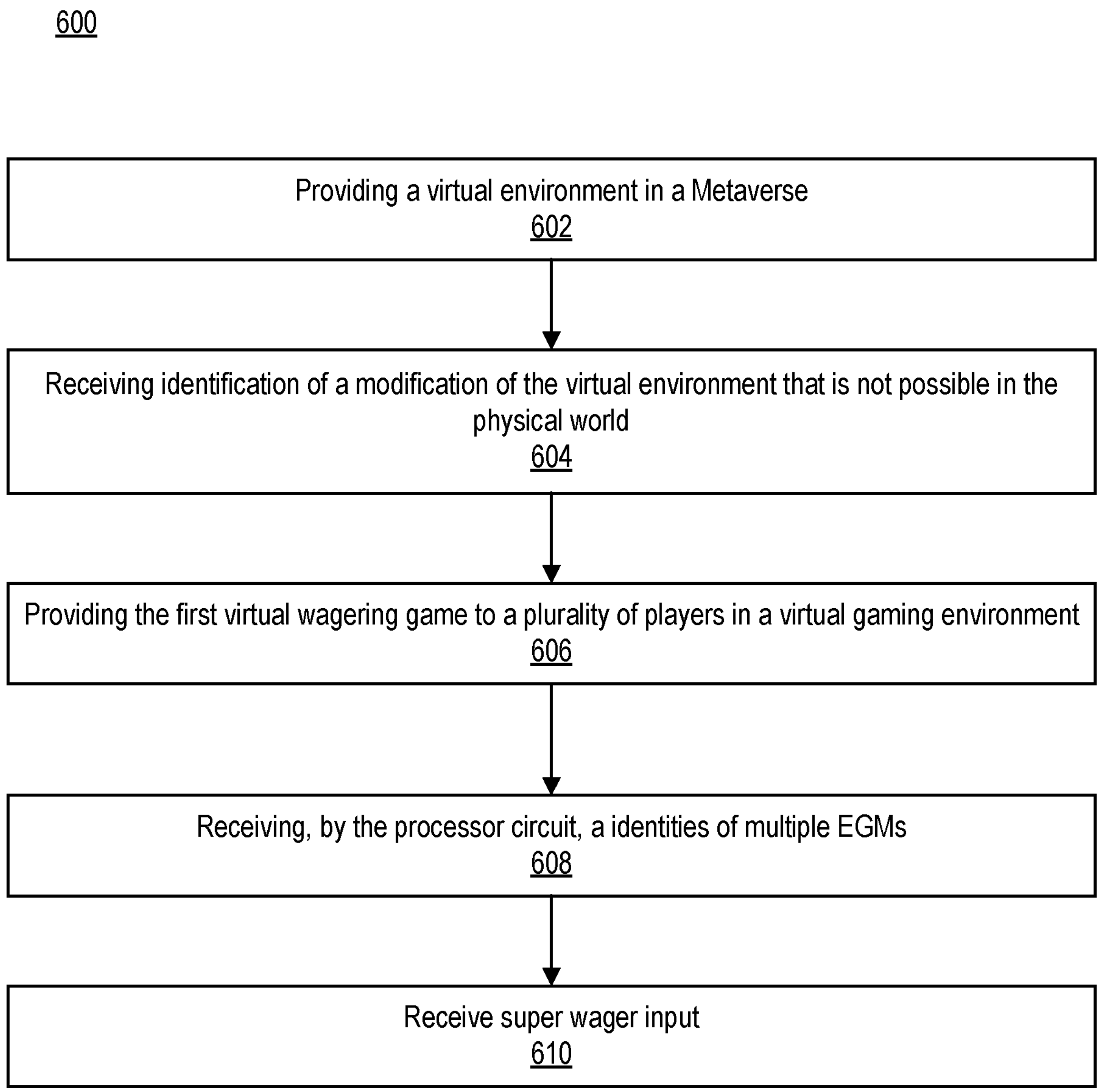
FIG. 6 is a flowchart illustrating operations of systems/methods of generating and providing a virtual wagering game is illustrated, according to some embodiments.

Reference is now made to FIG. 6, which is a flowchart illustrating operations of systems/methods of generating and providing a virtual wagering game is illustrated, according to some embodiments. Operations include providing (block 602), by a processor circuit, a virtual environment in a metaverse. In some embodiments, the virtual environment includes a virtual electronic gaming machine (EGM). Operations may further include receiving (block 604), via the processing circuit and from a gaming device that is in the physical world and that corresponds to a user, an identification of a modification to the virtual environment that is not possible in the physical world. Operations include providing (block 606) the modification to the virtual gaming environment in responsive to receiving the identification of the modification and via the processing circuit.

Some embodiments provide a modification to change a quantity of virtual EGMs in the virtual environment. In some embodiments, the virtual EGM includes a first virtual EGM comprising a first game type and a second virtual EGM comprising a second game type that is different from the first game type. In some embodiments, the first game type includes a virtual symbol matching EGM and the second game type includes a virtual table game.

Some embodiments provide that the virtual EGM includes a game-show themed casino game that corresponds to a game show. In some embodiments, the modification to the virtual environment includes transporting the user to a virtual representation of the game-show and the virtual representation of the game-show provides the user a virtual interaction with virtual equipment that is specific to the game show.

Some embodiments provide that the modification to the virtual environment includes a modification to change a quantity of virtual EGMs in the virtual environment. For example, some embodiments provide that the virtual EGM includes a first virtual EGM including a first game type and a second virtual EGM including the first game type. Some embodiments provide that the first and second virtual EGMs are selectable by the user.

In some embodiments, the modification to the virtual environment includes a modification to change a quantity of virtual EGMs in the virtual environment and the virtual EGM includes multiple virtual EGMs that each have the same theme. In some embodiments, the processing circuit is caused to sequentially play different ones of the virtual EGMs in response to receiving a wager request.

In some embodiments, the processor circuit is further caused to receive (block 608) identities of multiple virtual EGMs that correspond to a virtual EGM favorite list that includes a first virtual EGM and a second EGM in the virtual environment.

In some embodiments, the processor circuit is further caused to receive (block 610) a super wager input from the user and to play all of the virtual EGMs in the virtual EGM favorite list at the same time.

Some embodiments provide that the modification to the virtual environment includes a modification to change a characteristic of the virtual EGM in the virtual environment. In some embodiments, the virtual EGM includes a virtual slot machine and the characteristic corresponds to a quantity of reels in the virtual slot machine. In some embodiments, the characteristic includes a selectable quantity of reels. Some embodiments provide that a limit on wager content is based on the reels in the virtual slot machine. Ins some embodiments, the virtual EGM includes a virtual slot machine. Some embodiments provide that the virtual EGM includes the characteristic corresponding to a reel height in the virtual slot machine and the characteristic includes a selectable reel height. Some embodiments provide that there is a limit on wager content that is based on the reel height in the virtual slot machine.

In some embodiments, the user includes a user avatar in the metaverse that corresponds to the user. Some embodiments provide that the virtual EGM includes a skill-based game, and the metaverse includes a spectator avatar corresponding to another user that is watching the user's performance on the virtual EGM. In some embodiments, the processor circuit is caused to receive a wager from the spectator avatar based on the user's performance in the virtual EGM.

In some embodiments, in response to the user losing their money in the metaverse, the processor circuit is further caused to receive a wager request to cause previous wagers to be replayed to gain a different outcome.

Some embodiments provide that, in response to the user triggering a given bonus, the processor circuit is caused to transfer the user within the metaverse to the virtual environment that corresponds to the given bonus. In some embodiments, the processing circuit is caused to merge content of multiple virtual EGMs into a single EGM.

Figure 7:
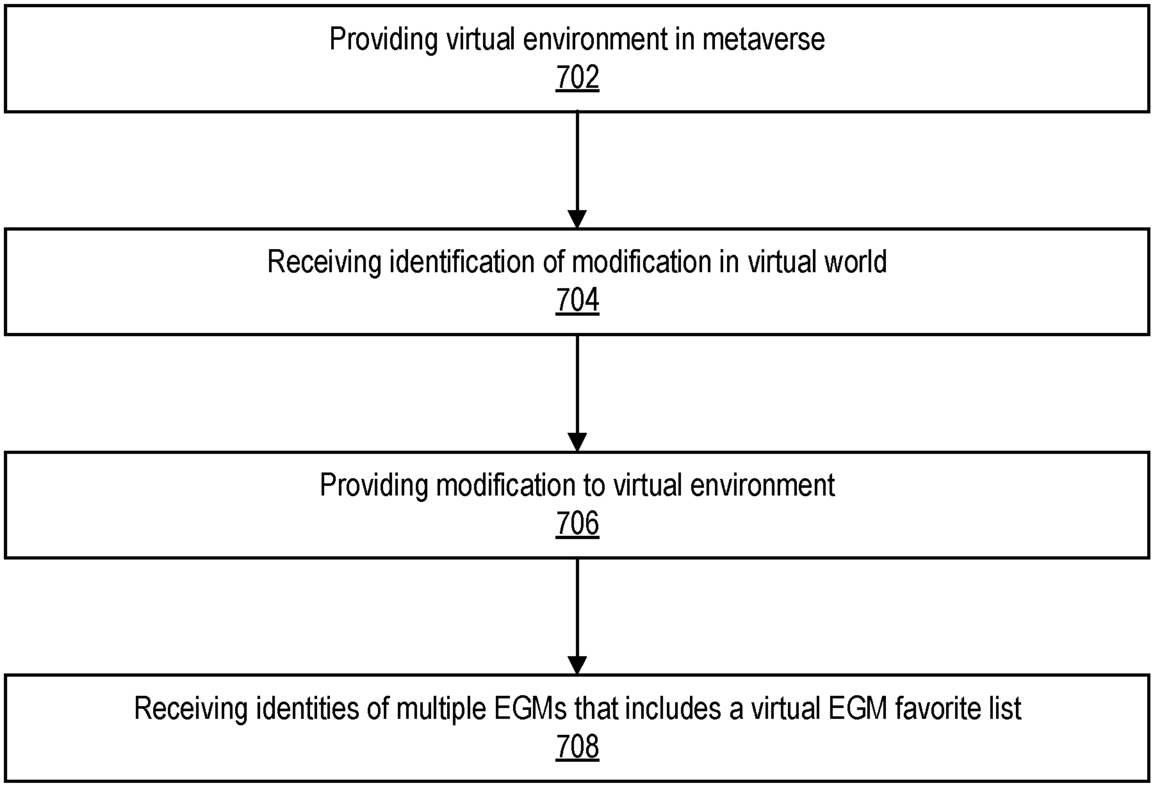
FIG. 7 is a flowchart illustrating operations of systems/methods of generating and providing a virtual wagering game is illustrated, according to some embodiments.

Reference is now made to FIG. 7, which is a flowchart illustrating operations of systems/methods of generating and providing a virtual wagering game is illustrated, according to some embodiments. Operations according to some embodiments include providing (block 702), by a processor circuit, a virtual environment in a metaverse, wherein the virtual environment comprises a virtual electronic gaming machine (EGM). Operations may further include receiving (block 704), from a gaming device that is in a physical world and that corresponds to a user, an identification of a modification to the virtual environment that is not possible in the physical world. Operations may include providing (block 706), providing, responsive to receiving the identification of the modification and via the processing circuit, the modification to the virtual environment and receiving (block 708) identities of multiple of virtual EGMs that correspond to a virtual EGM favorite list that includes a first virtual EGM and a second EGM in the virtual environment.

In some embodiments, the user includes a user avatar in the metaverse that corresponds to the user and the virtual EGM includes a skill-based game. Some embodiments provide that the metaverse includes a spectator avatar corresponding to another user that is watching the user's performance on the virtual EGM. In such embodiments, the processor circuit may be caused to receive a wager from the spectator avatar based on the user's performance in the virtual EGM.

Figure 8:
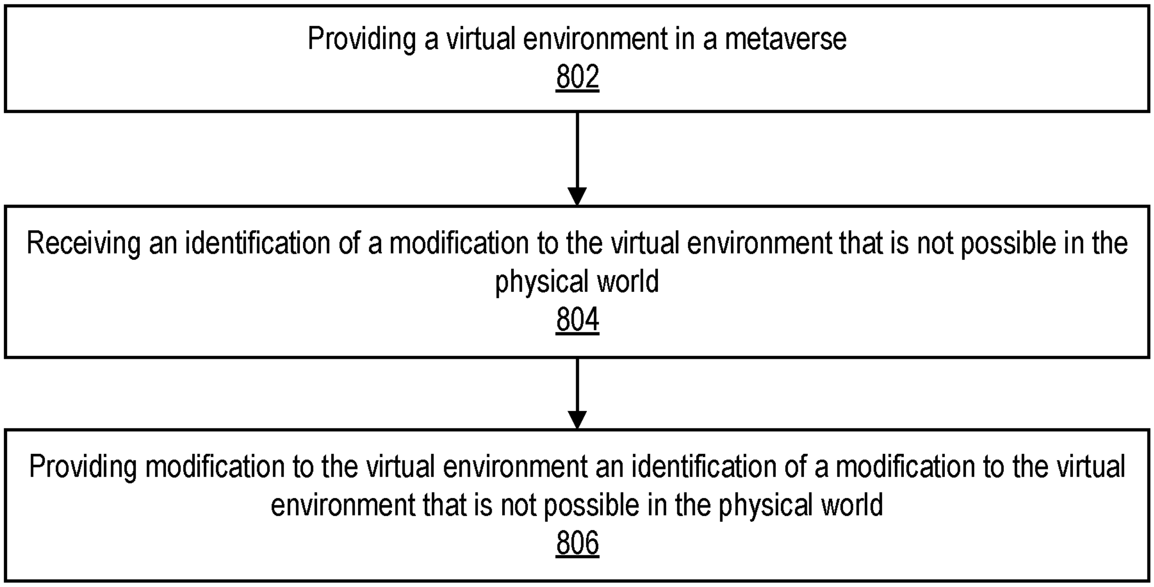
FIG. 8 is a flowchart illustrating operations of systems/methods of generating and providing a virtual wagering game is illustrated, according to some embodiments.

Reference is now made to FIG. 8, which is a flowchart illustrating operations of systems/methods of generating and providing a virtual wagering game is illustrated, according to some embodiments. Operations may cause a processor circuit to provide (block 802) a virtual environment in a metaverse. In some embodiments, the virtual environment includes a virtual electronic gaming machine (EGM). Operations may include receiving (block 804), from a gaming device that is in a physical world and that corresponds to a user, an identification of a modification to the virtual environment that is not possible in the physical world. Operations may include providing (block 806), responsive to receiving the identification of the modification and via the processing circuit, the modification to the virtual environment. In some embodiments, the modification to the virtual environment includes a modification to change a quantity of virtual EGMs in the virtual environment. In some embodiments, the virtual EGMs include a first game type having a virtual symbol matching EGM and a second game type including a virtual table game.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a processor circuit; and a memory coupled to the processor circuit, the memory comprising machine-readable instructions that, when executed by the processor circuit, cause the processor circuit to:

provide, by the processor circuit, a virtual environment in a metaverse, wherein the virtual environment comprises a virtual gaming area comprising virtual electronic gaming machines (EGMs);

receive, via the processing circuit and from a gaming device that is in a physical world and that corresponds to a user, an identification of a modification to the virtual environment that is not possible in the physical world, wherein the modification to the virtual environment comprises a modification to change a quantity of the virtual EGMs in the virtual environment; and provide, responsive to receiving the identification of the modification and via the processing circuit, the modification to the virtual environment.

2. The system of claim 1, wherein the virtual EGMs comprise a first virtual EGM comprising a first game type and a second virtual EGM comprising a second game type that is different from the first game type.

3. The system of claim 2, wherein the first game type comprises a virtual symbol matching EGM and the second game type comprises a virtual table game.

4. The system of claim 2, wherein the first virtual EGM comprises a game-show themed casino game that corresponds to a game show, wherein the modification to the virtual environment comprises transporting the user to a virtual representation of the game-show, and wherein the virtual representation of the game-show provides the user a virtual interaction with virtual equipment that is specific to the game show.

5. The system of claim 1, wherein the virtual EGMs comprise a first virtual EGM comprising a first game type and a second virtual EGM comprising the first game type, and wherein the first virtual EGM and the second virtual EGM are selectable by the user.

6. The system of claim 1, wherein the virtual EGMs comprise a plurality of virtual EGMs that each comprise a same theme, and wherein the processing circuit is caused to sequentially play different ones of the plurality of virtual EGMs responsive to receiving a wager request.

7. The system of claim 1, wherein the processor circuit is further caused to receive identities of a plurality of virtual EGMs that correspond to a virtual EGM favorite list that includes a first virtual EGM and a second EGM of the virtual EGMs.

8. The system of claim 7, wherein the processor circuit is further caused to receive a super wager input from the user and to play all of the virtual EGMs in the virtual EGM favorite list at the same time.

9. The system of claim 1, wherein the modification to the virtual environment comprises a modification to change a characteristic of a first virtual EGM of the virtual EGMs in the virtual environment.

10. The system of claim 9, wherein the virtual EGMs comprise a virtual slot machine, wherein the characteristic corresponds to a quantity of reels in the virtual slot machine, and wherein the characteristic comprises a selectable quantity of reels.

11. The system of claim 10, wherein a limit on wager content is based on the quantity of reels in the virtual slot machine.

12. The system of claim 9, wherein the virtual EGM comprises a virtual slot machine, wherein the virtual EGM comprises the characteristic corresponding to a reel height in the virtual slot machine, and wherein the characteristic comprises a selectable reel height.

13. The system of claim 12, wherein a limit on wager content is based on the reel height in the virtual slot machine.

14. The system of claim 1, wherein the user comprises a user avatar in the metaverse that corresponds to the user, wherein the metaverse comprises a spectator avatar corresponding to another user that is watching a performance of the user on a first virtual EGM of the virtual EGMs, and wherein the processor circuit is caused to receive a wager from the spectator avatar based on the performance of the user in the first virtual EGM.

15. The system of claim 1, wherein in response to the user losing their money in the metaverse, the processor circuit is further caused to receive a wager request to cause previous wagers to be replayed to gain a different outcome.

16. The system of claim 1, wherein, in response to the user triggering a given bonus, the processor circuit is caused to transfer the user within the metaverse to a second virtual environment that corresponds to the given bonus.

17. The system of claim 1, wherein the processing circuit is caused to merge content of the virtual EGMs into a single EGM.

18. A gaming device comprising:

a processor circuit; and a memory coupled to the processor circuit, the memory comprising machine-readable instructions that, when executed by the processor circuit, cause the processor circuit to:

provide, by the processor circuit, a virtual environment in a metaverse, wherein the virtual environment comprises a virtual gaming area comprising virtual electronic gaming machines (EGMs);

receive, from a gaming device that is in a physical world and that corresponds to a user, an identification of a modification to the virtual environment that is not possible in the physical world; and provide, responsive to receiving the identification of the modification and via the processing circuit, the modification to the virtual environment, wherein the modification to the virtual environment comprises a modification to change a quantity of the virtual EGMs in the virtual environment, wherein the virtual EGMs comprise a first game type comprising a virtual symbol matching EGM and a second game type comprising a virtual table game.

19. The system of claim 18, wherein a first virtual EGM of the virtual EGMs comprises a game-show themed casino game that corresponds to a game show, wherein the modification to the virtual environment comprises transporting the user to a virtual representation of the game-show, and wherein the virtual representation of the game-show provides the user a virtual interaction with virtual equipment that is specific to the game show.

20. The system of claim 18, wherein the processor circuit is further caused to receive identities of a plurality of virtual EGMs that correspond to a virtual EGM favorite list that includes a first virtual EGM and a second EGM of the virtual EGMs.

* * * * *